United States Patent [19]

Wilder

[11] Patent Number: 4,631,304

[45] Date of Patent: Dec. 23, 1986

[54] NOVEL CARBON BLACK AND PROCESS FOR PREPARING SAME

[75] Inventor: Charles R. Wilder, Bartlesville, Okla.

[73] Assignee: Phillips Petroleum Company, Bartlesville, Okla.

[21] Appl. No.: 713,505

[22] Filed: Mar. 18, 1985

Related U.S. Application Data

[62] Division of Ser. No. 518,556, Jul. 29, 1983, Pat. No. 4,518,434.

[51] Int. Cl.$^4$ .......................... C08K 3/04; C08K 9/00; C08K 9/02; C09C 1/48

[52] U.S. Cl. .................. 523/215; 106/288 B; 106/307; 423/415 R; 423/445; 423/449; 423/450; 423/460; 423/461; 524/496; 524/571; 524/575

[58] Field of Search ............... 423/445, 450, 460, 461, 423/449, 415 R; 106/307, 288 B; 524/496; 523/215

[56] References Cited

U.S. PATENT DOCUMENTS

| | | | |
|---|---|---|---|
| 2,707,674 | 5/1955 | Sweitzer | 106/307 |
| 2,717,914 | 9/1955 | Harbison | 260/763 |
| 3,023,118 | 2/1962 | Donnet | 106/307 |
| 3,024,092 | 3/1962 | Gessler | 106/307 |
| 3,025,259 | 3/1962 | Watson et al. | 106/307 |
| 3,216,843 | 11/1965 | Heller et al. | 106/307 |
| 3,250,634 | 5/1966 | Kraus et al. | 106/307 |
| 3,279,935 | 10/1966 | Daniell et al. | 423/460 |
| 3,329,646 | 7/1967 | Gessler | 106/307 |
| 3,330,799 | 7/1967 | Voet et al. | 106/307 |
| 3,353,980 | 11/1967 | Johnson | 106/307 |
| 3,481,754 | 12/1969 | Lewis et al. | 106/307 |
| 3,717,494 | 2/1973 | Jager et al. | 106/307 |
| 3,992,218 | 11/1976 | Suetsugu et al. | 423/449 |
| 4,075,140 | 2/1978 | Hunt | 106/307 |
| 4,075,156 | 2/1978 | Johnson | 423/460 |
| 4,075,160 | 2/1978 | Mills et al. | 423/445 |
| 4,138,471 | 2/1979 | Lamond et al. | 423/460 |
| 4,228,143 | 10/1980 | Cheng et al. | 423/445 |
| 4,282,199 | 8/1981 | Lamond et al. | 423/460 |
| 4,360,627 | 11/1982 | Okado et al. | 106/307 |
| 4,435,378 | 3/1984 | Reck et al. | 423/460 |
| 4,518,434 | 5/1985 | Wilder . | |

FOREIGN PATENT DOCUMENTS

862018  3/1961  United Kingdom ............... 423/460

OTHER PUBLICATIONS

Derwent Abs. 12212, Y/07 (J77002874) 1–1977.
Derwent Abs. 21811, K/09 (RO-79676), Comb. Pet. Pit. 7/82.
Derwent Abs. 49786, E/24 (SU-857194), 8/81.
Derwent Abs. 60224, E/29 (J57094030), 6/82.
Rub. World. Blue Bk, 1981, pp. 17–48, 49–68, 72–92a, 166–173.
Kirk-Othmer, Ency. of Chem. Tech., 3rd ed, vol. 4, pp. 659–660.

*Primary Examiner*—Herbert J. Lilling
*Attorney, Agent, or Firm*—John R. Casperson

[57] ABSTRACT

Carbon black which has been treated with organic peroxides imparts high scorch resistance to rubber into which it has been compounded.

6 Claims, No Drawings

NOVEL CARBON BLACK AND PROCESS FOR PREPARING SAME

BACKGROUND OF THE INVENTION

This application is a division of application Ser. No. 518,556, filed July 29, 1983, now U.S. Pat. No. 4,518,434.

In one aspect, the invention relates to a novel carbon black. In another aspect, the invention relates to a process for preparing a novel carbon black. In another aspect, the invention relates to a novel rubber composition containing carbon black.

It is well known that the pH of a carbon black has a marked effect on the rate of vulcanization of the rubber into which it has been compounded. High pH carbon blacks accelerate cure or vulcanization. A problem with very rapid cure rates in rubber compounds is that it is difficult to control the properties of the finished rubber product. Control of tensile strength, heat buildup, compression set, hardness, resistance to abrasion, modulus of elasticity, elongation, and the like is complicated by fast cure.

Carbon blacks having a low pH impart a reduced "scorchiness" and slower rate of curing of the rubber into which they have been compounded. This enables closer control of the properties in the final rubber product, such as by manipulating the amounts of organic accelerator and sulfur in the masterbatch.

OBJECTS OF THE INVENTION

It is an object of this invention to provide a carbon black having a low pH.

It is a further object of this invention to provide a method for producing a carbon black having a low pH.

It is yet another object of this invention to provide a rubber composition which contains a carbon black having a low pH.

SUMMARY OF THE INVENTION

According to certain aspects of the present invention, there is provided a process which comprises treating a carbon black with an organic peroxide under conditions to reduce its pH.

According to certain other aspects of the present invention, there is provided a novel carbon black which has been treated according to a process comprising applying an organic peroxide to the carbon black and then heating the carbon black having applied organic peroxide thereon at a temperature in the range of from about 100° C. to about 300° C. for a period of time of at least about 0.1 hour.

According to a still further aspect of the present invention, there is provided a carbon black pellet which has been treated with an organic peroxide by incorporating the organic peroxide into the pelleting liquid used in forming the carbon black pellet, or by spraying a solution of organic peroxide onto the pellets during the passage of the pellets through a dryer being operated to remove the pelleting liquid from the pellets.

According to a still further aspect of the present invention, there is provided a rubber composition which is produced by curing a mixture comprising from about 10 to about 100 parts by weight of carbon black per 100 parts by weight of rubber, where the carbon black has been treated with an organic peroxide to decrease its pH.

DETAILED DESCRIPTION OF THE INVENTION

Carbon black suitable for treatment in accordance with the present invention can be most any carbon black produced by a furnace process. Generally, these carbon blacks will be characterized by a surface area which is in the range of from about 20 to 200 m$^2$/g as measured by either the nitrogen or CTAB methods. More usually, the surface area of the carbon blacks used will range from about 40 to 160 m$^2$/g by the nitrogen method since these carbon blacks are most commonly found in vehicular tires and the largest portion of furnace-type carbon black goes to the manufacture of tires. The carbon blacks will generally have a structure in the range of from about 20 to 200 cm$^3$/100 g, more usually between about 40 and 140 cm$^3$/100 g, as measured by the DBP method (ASTM D2414). The pH of the carbon blacks suitably treated in accordance with the present invention will usually range from about 5 to about 10, more usually from about 6 to about 8.

The organic peroxides with which the carbon black is treated are generally those represented by the formula R—O—O—R' where R and R' comprise hydrogen and carbon and can be the same or different. Usually, each of the R and R' will contain from about 1 to about 16 carbon atoms, usually from about 4 to about 12 carbon atoms. More preferably, each of the R and R' are hydrocarbyl since hydrocarbyl peroxides are expected to be compatible with the other various agents normally used in the compounding of rubber, although it is contemplated also that acyl peroxides, such as benzoyl peroxides and peroxy esters, such as t-butyl perbenzoate and ethyl-3,3-bis(t-butyl peroxy)butyrate may be used as well. It is expected that most any peroxide which finds use as a rubber vulcanizer will have good utility for treating the carbon black of the present invention, since this class of peroxides is expected to both alter the properties of the carbon black upon treatment and also be compatible with the later compounding of the carbon black in the rubber goods. Examples of suitable organic peroxides include those peroxides selected from the group consisting of [α,α-dimethyl-α(t-butylperoxy)methyl]benzene, dicumyl peroxide, 2,5-bis(t-butylperoxy)-2,5-dimethyl hexane, and 2,5-bis(t-butylperoxy)-2,5-dimethyl hexyne-3.

Generally, the organic peroxide will be mixed with the carbon black in an amount of from about 1 to about 30 parts by weight of organic peroxide for each 100 parts by weight of carbon black, more usually from about 2 to about 20 parts by weight of organic peroxide per 100 parts by weight of carbon black. The mixing can take place in most any suitable manner. The ingredients can be mixed in a blending device such as a mixer or roll mill. It is expected that especially good results will be obtained where the organic peroxide has been incorporated into the pelleting liquid used to pellet the carbon black pellets in the pelleting process. Another manner in which it is expected that good results can be achieved is by spraying a solution or dispersion of the organic peroxide into the dryer used to dry the carbon black pellets once they have been wetted with pelleting liquid. Where this embodiment of the invention is practiced, the solution of organic peroxide is preferably introduced into a drum dryer at its upstream end, so that the pellets will be exposed to desirably high temperatures prior to their being recovered for shipment to rubber compounders.

It is preferable after applying the organic peroxide to the carbon black to heat the resulting mixture at a temperature generally in the range from about 100° C. to about 400° C. for a time period of at least 0.1 hour, generally about from 0.1 to about 10 hours. More preferably, the carbon black after treatment will be exposed to a temperature in the range from about 100° C. to about 200° C. for a time period in the range of from about 0.1 to about 3 hours, since conditions and residence time in a carbon black dryer in a plant will usually be within this range. Most preferably, the pellets will be heated to a temperature within the range of from about 130° C. to about 190° C. for a time period in the range of from about 0.1 to about 1 hour such as would be the case where the carbon black pellets were dried in the drum dryer found in many carbon black plants.

The peroxide-treated carbon black produced in accordance with the invention can be compounded in the rubber goods as if it were a conventional carbon black, such as a slow curing carbon black. Generally, for each 100 parts by weight of rubber, there will be added from about 10 to about 100 parts by weight of carbon black, from about 0 to about 40 parts by weight of optional extender oil, from about 1 to about 5 parts by weight of sulfur, from about 0.5 to about 4 parts by weight of accelerator, and from about 1 to about 8 parts by weight of an activator. Preferably, for every 100 parts by weight of rubber, there will be added from about 40 to about 60 parts by weight of carbon black, from about 0 to about 10 parts by weight of optional extender oil, from about 1 to about 3 parts by weight of sulfur, from about 1.75 to about 2.5 parts by weight of a cure accelerator, and from about 3 to about 5 parts by weight of an activator.

Most any conventional rubber can be compounded with a carbon black according to the present invention. For example, polyisoprene, polybutadiene, and butadiene-styrene copolymer are expected to yield good results when combined with the peroxide-treated carbon black. Preferably, emulsion polymerized SBR having a Mooney viscosity at 100° C. of from about 30 to about 130, preferably from about 30 to about 55, and a bound styrene content of 10–50, preferably 22 to about 25 is used since tests indicate this will provide good results. For a cure accelerator, most any commercially available material can be used, especially the benzothiazyl sulfenamides, most preferably N-t-benzyl-2-benzothiazyl sulfenamide. For the activator, most any suitable commercial activator can be used, preferably zinc oxide and stearic acid, most preferably at a weight ratio in the range of from about 2:1 to about 4:1. As an extender oil, any of the paraffinic, naphthenic or aromatic hydrocarbon extender oils commonly used in the compounding of rubber are suitable.

Blending of the ingredients can be in most any suitable mixing device such as an internal mixer or roll mill. Curing of the masterbatch can be done at a temperature ranging from 100° C. to about 200° C., preferably 130° to about 160° C., most preferably at about 140° to about 150° C. under elevated pressure conditions in the range of about 40 to about 10,000 psi, preferably 500–5,000 psi for a time sufficient to afford adequate curing. Most preferably, curing is carried out for a time period in the range of from about 20 to about 60 minutes.

The carbon blacks produced in accordance with the invention can be used for making rubber tires, molded rubber goods, extruded plastics and industrial products such as wires, cables, hoses and the like.

EXAMPLE I

This example illustrates the treatment of carbon black with organic peroxides in accordance with this invention. About 10 parts by weight of either an organic peroxide (described below) or an accelerator (Butyl Eight, an activated dithiocarbamate, marketed by Vanderbilt Company, Norwalk, CT; used in a control run) and 100 parts by weight of IRB #4 carbon black were mixed in a beaker and then heated for 2 hours at about 170° C. The peroxides employed were: Lupersol 130 (2,5-di(tert-butylperoxy)-2,5-dimethyl hexyne-3; marketed by Lucidol, Division of Pennwalt Corporation, Genesee, N.Y.); Di-Cup R (dicumyl peroxide, marketed by Hercules, Inc., Wilmington, Del.), and Varox DBPH Liquid (2,5-bis(tert-butylperoxy)-2,5-dimethyl hexane, marketed by R. T. Vanderbilt Company, Norwalk, CT).

Pertinent parameters of thus treated carbon black are summarized in Table I.

TABLE I

| Run | Treating Agent | Surface Area (m$^2$/g) N$_2$ Adsorpt.[1] | Surface Area (m$^2$/g) CTAB Adsorpt.[2] | DBP Absorpt.[3] (mL/100 g) | pH[4] |
|---|---|---|---|---|---|
| 1 Control[5] | None | 80 | 82 | 87 | 5.9 |
| 2 Invention | Lupersol 130 | 76 | 69 | 93 | 3.6 |
| 3 Invention | Di-Cup R | 76 | 72 | 90 | 3.8 |
| 4 Invention | Varox Liquid | 77 | 70 | 92 | 5.0 |
| 5 Control | Butyl Eight | 70 | 61 | 87 | 3.2 |

[1] Determined according to ASTM D3037, using nitrogen.
[2] Determined according to ASTM D3765, using cetyl-trimethyl ammonium bromide.
[3] Determined according to ASTM D3493, using dibutyl phthalate; test considered a measure of structure (i.e., degree of agglomeration of carbon black particles).
[4] Determined according to ASTM D1512.
[5] Untreated Carbon Black was also heated at 170° C. for 2 hours.

Data in Table I show that heat treatment of carbon black with organic peroxides (runs 2–4) caused reduced surface area, higher structrue (i.e., higher DBP adsorption) and lower pH. Corresponding treatment with a dithiocarbamate accelerator (run 5) lowered surface area, but structure appeared unchanged.

EXAMPLE II

This example illustrates the preparation and curing of rubber compounds using the treated carbon blacks described in Example I. Said compounds contained the following ingredients: 100 parts by weight of SBR 1500 rubber (a commercially available emulsion-polymerized butadienestyrene copolymer having a butadiene:styrene weight ratio of 75:25, marketed by Copolymer Corp., Baton Rouge, LA), 50 parts by weight of carbon black (see Example I); 3 parts by weight of zinc oxide, 1 part by weight of stearic acid, 1.75 parts by weight of sulfur, and 1 part by weight of Santocure NS (N-t-butyl-2-benzothiazyl sulfenamide, marketed by Monsanto Industrial Chemicals Company, St. Louis, Mo.) were compounded on a 6"×12" roll mill at 50°±5° C., essentially according to the procedure of ASTM D3191-75, Section 5.

Sheeted rubber compounds were cured in a compression mold at about 145° C. for 50 minutes at a pressure of about 1000 psi on the mold. Slabs of 6"×6" size were cut for tensile measurements. Unvulcanized strips were rolled into pellets and were cured separately for hysteresis and resilience tests. Mooney, scorch time and cure time determinations were made on portions of the uncured compounds. Pertinent test data of cured rubber carbon black compounds are summarized in Table II.

TABLE II

| Run | 1[7] Control | 2 Invention | 3 Invention | 4 Invention | 5 Control |
|---|---|---|---|---|---|
| Scorch Time, 160° C., 2 Point Rise[1], minutes | 9.7 | 7.7 | 7.3 | 7.3 | 5.1 |
| Time to 90% Cure[1], minutes at 160° C. | 15.8 | 22.8 | 20.3 | 19.5 | 13.7 |
| Scorch Time[2], 140° C., 5 Point Rise[2], minutes | 18.8 | 25.7 | 24.7 | 22.8 | 15.1 |
| Mooney Viscosity[2], at 100° C. | 77 | 76 | 73 | 76 | 75 |
| 300%-Modulus[3], MPa | 16.8 | 10.3 | 10.1 | 11.7 | 14.4 |
| Tensile Strength[4], MPa | 27.6 | 25.0 | 24.7 | 25.8 | 25.8 |
| Elongation[3], % | 430 | 580 | 570 | 580 | 460 |
| Hysteresis, $\Delta T$[4], °C. | 39.1 | 48.0 | 44.4 | 43.8 | 36.5 |
| Permanent Set[4], % | 2.5 | 6.6 | 4.4 | 3.6 | 1.4 |
| Resilience[5], % | 62.1 | 59.2 | 59.5 | 59.6 | 63.0 |
| Shore A Hardness[6] | 68 | 66 | 66 | 67 | 69 |

[1] Determined at 160° C. according to ASTM D2084, employing a Monsanto Rheometer having a rotor of 35.55 mm diameter;
[2] determined according to ASTM D1646, at 140° C., employing a 38.10 mm diameter rotor;
[3] determined at 78° F. according to ASTM D412, Method A, employing a CRE-2K tensile machine;
[4] determined according to ASTM D623, Method A, employing a Goodrich flexometer and using a specimen size of 0.7" diameter/1.0" height;
[5] determined according to ASTM D945, using the same specimen as in [4];
[6] determined according to ASTM D2240, employing a Shore durometer Type A;
[7] another control run employing untreated IRB #4 carbon black that was not previously heated exhibited essentially the same experimental results as control run 1 with heat-treated carbon black.

Data in Table II clearly show that rubber compounds containing said black samples were less scorchy by Mooney scorch test than control compounds containing either untreated carbon black or another acidic carbon black. Modulus, tensile strength, and resilience were lower, whereas elongation and permanent were higher for cured rubber compounds of invention runs 2–4 than for control runs 1 and 5.

What is claimed is:

1. A carbon black pellet which has been treated with an organic peroxide by incorporating said organic peroxide into the pelleting liquid used in forming the carbon black pellet wherein the carbon black is characterized by a surface area in the range of 20–200 m$^2$/g, a DBP structure in the range of 20–200 cm$^3$/g and a pH in the range of 5–10 and the organic peroxide is characterized by the formula R—O—O—R' in which R and R' can be the same or different and comprise hydrocarbyl groups containing in the range of from about 4 to about 12 carbon atoms, from about 1 to about 30 parts by weight of organic peroxide having been applied to each 100 parts by weight of carbon black and wherein the pelleting liquid comprises water.

2. A carbon black pellet which has been treated with an organic peroxide by spraying a sollution of said organic peroxide onto the pellets during the passage of the pellets through a drum dryer being operated to remove pelleting liquid from the pellets wherein the carbon black is characterized by a surface area in the range of 20–200 m$^2$/g, a DBP structure in the range of 20–200 cm$^3$/g and a pH in the range of 5–10 and the organic peroxide is characterized by the formula R—O—O—R' in which R and R' can be the same or different and comprise hydrocarbyl groups containing in the range of from about 4 to about 12 carbon atoms, from about 1 to about 30 parts by weight of organic peroxide having been applied to each 100 parts by weight of carbon black.

3. A carbon black pellet as in claim 2 which has been heated to a temperature in the range of 100° C. to 200° C. during its passage through the drum dryer and was provided with a residence time in the drum dryer in the range of from about 0.1 to about 1 hour.

4. A rubber composition comprising from about 10 to about 100 parts by weight of carbon black pellet as in claim 5 per 100 parts of weight of rubber.

5. A rubber composition as in claim 4 wherein the carbon black is impregnated with the organic peroxide and then heated at a temperature in the range of from about 100° to about 200° C. for a period of time in the range of from about 0.1 to about 3 hours.

6. A rubber composition as in claim 5 wherein the rubber is selected from the group consisting of natural rubber, polyisoprene, polybutadiene, butadiene-styrene copolymer, and mixtures thereof.

* * * * *